(12) United States Patent
Esbensen et al.

(10) Patent No.: US 10,833,885 B2
(45) Date of Patent: Nov. 10, 2020

(54) EFFICIENT MULTICAST GROUP CREATION

(71) Applicant: Silicon Laboratories Inc., Austin, TX (US)

(72) Inventors: Anders Lynge Esbensen, København (DK); Karoline Malmkjær, København (DK); Jakob Buron, Søborg (DK)

(73) Assignee: Silicon Laboratories, Inc., Austin, TX (US)

( * ) Notice: Subject to any disclaimer, the term of this patent is extended or adjusted under 35 U.S.C. 154(b) by 74 days.

(21) Appl. No.: 16/227,843

(22) Filed: Dec. 20, 2018

(65) Prior Publication Data

US 2020/0204384 A1    Jun. 25, 2020

(51) Int. Cl.
| | |
|---|---|
| *H04L 12/28* | (2006.01) |
| *H04L 12/18* | (2006.01) |
| *H04L 12/66* | (2006.01) |
| *H04L 29/06* | (2006.01) |
| *H04W 4/08* | (2009.01) |

(52) U.S. Cl.
CPC .......... *H04L 12/185* (2013.01); *H04L 12/189* (2013.01); *H04L 12/2803* (2013.01); *H04L 12/66* (2013.01); *H04L 65/4076* (2013.01); *H04W 4/08* (2013.01)

(58) Field of Classification Search
CPC ........ G05B 2219/2642; H04L 12/2803; H04L 12/2836; H04L 12/2838; H04L 12/2818; H04L 12/2827; H04L 12/46; H04L 12/4625; H04L 67/10; H04L 69/18; H04L 65/4076; H04L 65/605; H04L 67/12; H04L 12/185; H04L 12/283; H04L 12/66; H04L 47/806; H04L 65/1033; H04L 67/34; H05B 47/19
See application file for complete search history.

(56) References Cited

U.S. PATENT DOCUMENTS

| | | |
|---|---|---|
| 6,049,878 A | 4/2000 | Caronni et al. |
| 2007/0266174 A1 | 11/2007 | Bestler |
| 2009/0083536 A1 | 3/2009 | Weis et al. |
| 2010/0260254 A1 | 10/2010 | Kimmich et al. |

(Continued)

OTHER PUBLICATIONS

Office action dated Aug. 4, 2020 in co-pending U.S. Appl. No. 16/218,710.

*Primary Examiner* — Jae Y Lee
*Assistant Examiner* — Aixa A Guadalupe Cruz
(74) *Attorney, Agent, or Firm* — Nields, Lemack & Frame, LLC

(57) ABSTRACT

A system and method for efficiently creating multicast groups is disclosed. The system includes a gateway controller, that receives a multicast request from a client. The gateway controller parses the request from the client and identifies the set of the desired destination nodes. The gateway controller then determines whether an existing multicast group matches this set. If not, the gateway controller creates a new multicast group, preferably by modifying an existing multicast group by adding new destination nodes to that group. This is an efficient way to create multicast groups, as it increases the number of nodes reacting simultaneously to multicast messages when creating multicast groups, and minimizes the number of messages that are required to synchronize the nodes to the new multicast group.

19 Claims, 5 Drawing Sheets

(56) References Cited

U.S. PATENT DOCUMENTS

| | | | |
|---|---|---|---|
| 2016/0007138 A1* | 1/2016 | Palanisamy | H04W 4/70 |
| | | | 455/41.2 |
| 2017/0104669 A1 | 4/2017 | Bell et al. | |
| 2017/0223807 A1* | 8/2017 | Recker | H04B 47/16 |
| 2018/0014387 A1* | 1/2018 | Bard | H05B 47/19 |
| 2020/0195653 A1 | 6/2020 | Esbensen et al. | |

* cited by examiner

| MULTICAST GROUP ID | LIST OF NODES | CRYPTOGRAPHIC STATE INFORMATION |
|---|---|---|
| 1 | 102a, 102b 102c, 102d | 2875488604386318738 |
| 2 | 102a, 102b | 9813589015635681965 |
| ... | | |
| N | 102a, 102c, 102d | 821578923487546879 |

FIG. 4

EFFICIENT MULTICAST GROUP CREATION

FIELD

This disclosure describes systems and methods for efficiently creating multicast groups in a network, and more particularly, modifying existing multicast groups to minimize disruption in the network.

BACKGROUND

In most wireless networks, data is communicated between devices using packets of information. In certain embodiments, packets are transmitted from a source to a specific destination through the use of a routing protocol. In other embodiments, packets are transmitted from a source to a plurality of destinations simultaneously through the use of multicast messages.

An example of the use of multicast messages in smart home applications occurs when a controller wants to turn on or off a group of devices. The controller issues a multicast message that is intended for all of the network devices associated with the group of devices. By using multicast messages, it is perceived by the user that these operations are performed at the same time. Furthermore, the use of multicast messages reduces the amount of network traffic as multiple devices receive the same message.

Additionally, these smart home network devices are becoming more sophisticated and more concerned about security. For example, the network protocols associated with each mesh network may include network security keys that are used to encrypt all transmissions. Network devices may be assigned to different security classes based on their function and their capabilities.

At times, a client may wish to transmit a multicast message to a plurality of network devices. If the network devices are not already part of the same multicast group, the controller may need to create a new multicast group. However, creating a new multicast group may require many messages to be transmitted. For example, each network device must receive a first message informing it that it is part of the new multicast group. This may be referred to as joining the multicast group. In networks that provide security through the use of encryption, each network device that is part of the new multicast group must also receive a message informing it of the nonce that is to be used. This may be referred to as synchronizing the network device to the multicast group. Thus, the creation of a new multicast group can result in numerous singlecast messages, consuming time and network bandwidth.

Therefore, it would be advantageous if there were a system and method of efficiently creating multicast groups that did not require at least two messages to be sent to each network device that is going to be part of that multicast group. Further, it would be beneficial if this system and method did not add additional complexity to existing network devices.

SUMMARY

A system and method for efficiently creating multicast groups is disclosed. The system includes a gateway controller, that receives a multicast request from a client. The gateway controller parses the request from the client and identifies the set of the desired destination nodes. The gateway controller then determines whether an existing multicast group matches this set. If not, the gateway controller creates a new multicast group, preferably by modifying an existing multicast group by adding new destination nodes to that group. This is an efficient way to create multicast groups, as it increases the number of nodes acting simultaneously, which improves the user experience significantly. Furthermore, this system and method also minimizes the number of messages that are required to synchronize the nodes to the new multicast group.

According to one embodiment, a method of using a gateway controller to communicate with a plurality of destination nodes, wherein the plurality of destination nodes utilize a network protocol that supports multicast is disclosed. The method comprises receiving at a second network interface of the gateway controller, a request from a client that is destined for the plurality of destination nodes, the plurality of destination nodes defining a set; determining within the gateway controller whether an existing multicast group contains only the set, and, if so, sending a multicast message using the existing multicast group; otherwise, identifying candidate multicast groups that are a subset of the set; choosing one of the candidate multicast groups, referred to as a selected multicast group, to be modified; modifying the selected multicast group, wherein the modification consists of adding nodes to the selected multicast group to form the set; and sending a multicast message to the selected multicast group. In certain embodiments, the network protocol comprises Z-Wave protocol. In certain embodiments, the selected multicast group is chosen based on a number of nodes in common with the set. In certain embodiments, the selected multicast group is chosen based on use, wherein the selected multicast group may be the least recently used or the least used. In some embodiments, the method further comprises if no candidate multicast groups are identified, creating a new multicast group; and sending a multicast message to the new multicast group. In some embodiments, the new multicast group is created by adding a new entry to a table, the table containing a list of multicast groups, and the nodes in each multicast group. In other embodiments, the new multicast group is created by deleting an entry in a table, the table containing a list of multicast groups, and the nodes in each multicast group; and rewriting the entry with a new list of nodes and new cryptographic information.

According to another embodiment, a gateway controller is disclosed. The gateway controller comprises a first network interface utilizing a network protocol that supports multicast; a second network interface; a processing unit; and a memory device in communication with the processing unit, comprising instructions, which, when executed by the processing unit, enable the gateway controller to: receive at a second network interface of the gateway controller, a request from a client that is destined for a plurality of destination nodes, the plurality of destination nodes defining a set; determine within the gateway controller whether an existing multicast group contains only the set, and, if so, send a multicast message using the existing multicast group; otherwise, identify candidate multicast groups that are a subset of the set; choose one of the candidate multicast groups, referred to as a selected multicast group, to be modified; modify the selected multicast group, wherein the modification consists of adding nodes to the selected multicast group to form the set; and send a multicast message to the selected multicast group. In certain embodiments, the network protocol comprises Z-Wave protocol. In some embodiments, the gateway controller chooses the selected multicast group based on a number of nodes in common with the set. In some embodiments, the gateway controller chooses the selected multicast group based on use, such as the least recently used multicast group or the least used multicast group. In certain embodiments, the instructions enable the gateway controller to: if no candidate multicast groups are identified, create a new multicast group; and send a multicast message to the new multicast group. In some embodiments, the instructions enable the gateway controller to create the new multicast group by: adding a new entry to a table, the table containing a list of multicast groups, and the nodes in each multicast group. In certain embodiments, the instructions enable the gateway controller to create the new multicast group by: deleting an entry in a table, the table containing a list of multicast groups and the nodes in each multicast group; and rewriting the entry with a new list of nodes and new cryptographic information.

According to another embodiment, a method of using a gateway controller to communicate with a plurality of destination nodes, wherein the plurality of destination nodes utilize a network protocol that supports multicast is disclosed. The method comprises receiving at a second network interface of the gateway controller, a request from a client that is destined for the plurality of destination nodes; and sending a multicast message to the plurality of destination nodes using a multicast group, wherein the multicast group is created by adding additional nodes to an existing multicast group.

BRIEF DESCRIPTION OF THE DRAWINGS

For a better understanding of the present disclosure, reference is made to the accompanying drawings, in which like elements are referenced with like numerals, and in which:

FIG. 4 is a representative table illustrating the relationship between multicast group ID, nodes and cryptographic information.

DETAILED DESCRIPTION

Figure 1:
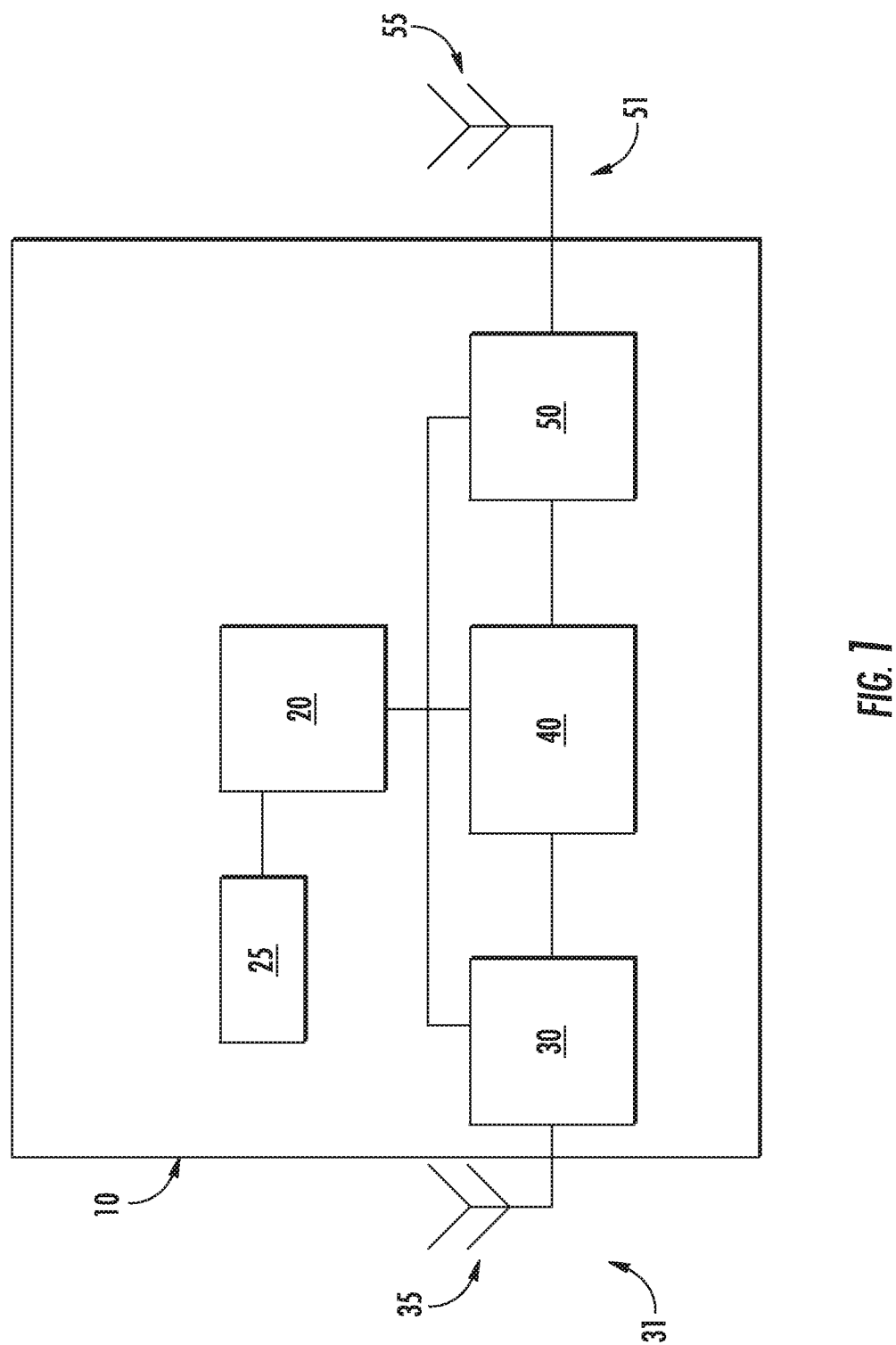
FIG. 1 is a block diagram of a representative network device.

FIG. 1 shows a block diagram of a representative network device 10. This network device may serve as a gateway controller or a destination node, as described in more detail below.

As shown in FIG. 1, the network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The network device 10 also includes a network interface 30, which may be a wireless interface including an antenna 35. The network interface 30 may support any wireless network that supports multiple security classes and multicast, such as WiFi, networks utilizing the IEEE 802.15.4 specification, such as Zigbee, networks utilizing the IEEE 802.15.6 specification, and wireless smart home protocols, such as Z-Wave. The network interface 30 is used to allow the network device 10 to communicate with other devices disposed on the first network 31.

In certain embodiments, more than one wireless network protocols may be supported using the network interface 30. In these embodiments, there may be more than one first network 31 that the network device 10 communicates with using the network interface 30. For example, a Zigbee network and a Thread network may utilize the same network interface.

In certain embodiments, the network device 10 includes a second network interface 50, which may also be a wireless interface including an antenna 55. The second network interface 50 may support any wired or wireless network, such as Ethernet, WiFi, or others. The second network interface 50 is used to allow the network device 10 to communicate with other devices disposed on the second network 51.

The network device 10 may include a second memory device 40 in which data that is received and transmitted by the network interface 30 and the second network interface 50 is stored. This second memory device 40 is traditionally a volatile memory. The processing unit 20 has the ability to read and write the second memory device 40 so as to communicate with the other nodes in the first network 31 and the second network 51. Although not shown, the network device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30, the second network interface 50 and the second memory device 40 are shown in FIG. 1 as separate components, it is understood that some or all of these components may be integrated into a single electronic component. Rather, FIG. 1 is used to illustrate the functionality of the network device 10, not its physical configuration.

Figure 2:
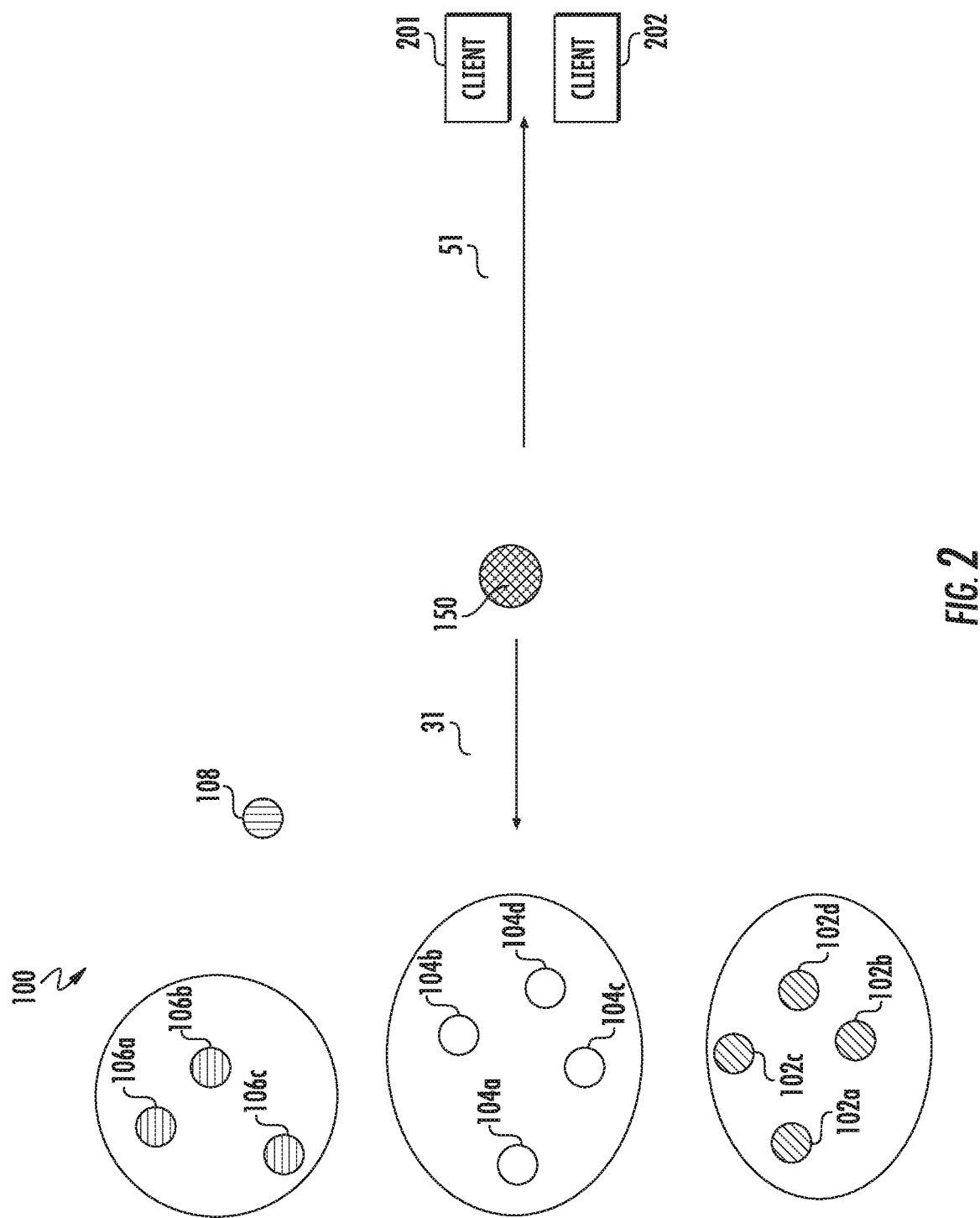
FIG. 2 shows a network having a plurality of network devices, including a gateway controller, clients and a plurality of destination nodes according to one embodiment.

FIG. 2 shows a network 100 having a plurality of network devices and a gateway controller 150. The plurality of network devices may include one or more devices. These network devices may be embedded in various elements, such as door locks, garage doors, sensors, light switches, light dimmers, light bulbs, thermostats, sensors, smart appliances and others.

Each of these network devices may contain some or all of the components described above and shown in FIG. 1. The architecture of the gateway controller 150 may differ somewhat from that of the other network devices. For example, the gateway controller 150 may have a more powerful processing unit 20. The memory device 25 and the second memory device 40 of the gateway controller 150 may have a greater capacity than that in other network devices. Further, the gateway controller 150 may be powered by a wall outlet. In certain embodiments, the gateway controller 150 may also include the second network interface 50 to connect to another wired or wireless network. For example, the gateway controller 150 may also be connected to an IP network, such as Ethernet or WiFi. Some or all of the other network devices may not include the second network interface 50.

Certain network protocols, such as Z-Wave, assign each network device a specific security class. For example, Z-Wave defines a "S2 Access Control" class that is the most trusted class, and is intended to cover access control devices, such as door locks and garage doors. Z-Wave also defines a "S2 Authenticated" class that is used for most other elements, such as sensors, thermostats and light switches. A "S2 unauthorized" class is the least trusted class and is intended only for devices that have limited capability. Further, in certain embodiments, the network 100 may also include older devices which operate using the S0 security framework. The S0 security framework is a legacy security protocol that has been superseded by the S2 security framework.

The network devices join the network 100 by being included by the gateway controller 150. The process by which these network devices are admitted to a security class is well documented.

Within the S2 security framework, each class communicates using a unique security key. In other words, communications among network devices in the "S2 Access Control" class are encrypted using a security key that is only known to these network devices. In this way, communications among this class of network devices cannot be intercepted and decrypted by other network devices. Similarly, communications among network devices in the "S2 Authenticated" class cannot be intercepted and decrypted by network devices in the "S2 Unauthenticated" class.

FIG. 2 shows a representative network 100, comprising a gateway controller 150 and a plurality of nodes. The gateway controller 150 has a first network interface that interfaces with the first network 31. The first network 31 may be a Z-wave network, a Zigbee network, or any other network that supports multicast and multiple security classes. The first network 31 may include a plurality of network devices, including destination nodes 102a-d, 104a-d, 106a-c and 108. These network devices may be parts of different security classes. In FIG. 2, destination nodes 102a-d are part of the "S2 Access Control" class, the destination nodes 104a-d are part of the "S2 Authenticated" class, and the destination nodes 106a-c are part of the "S2 Unauthenticated" class. The number of network devices that belong to each security class is not limited by this disclosure. Rather, this figure is purely illustrative. In addition, one or more legacy devices 108, which utilize the S0 security framework, may also be part of the network 100.

The gateway controller 150 may be capable of communicating with all of the network devices, regardless of their security class. In other words, the gateway controller 150 may possess the security keys associated with each security class. In one embodiment, shown in FIG. 4, the gateway controller 150 may include a table 400 showing the multicast group identifier, the network devices that belong to that multicast group ID and the security key for that multicast group ID. This table may be disposed in the memory device 25, the second memory device 40 or another memory device.

As shown in FIG. 2, the gateway controller 150 also has a second network interface that interfaces with the second network 51. The second network 51 may be a wired or wireless network. In some embodiments, the second network 51 may utilize an IP protocol, such as Ethernet or WiFi. One or more nodes, also referred to as clients, may be part of second network 51. In this embodiment, two nodes, referred to as client 201 and client 202 are shown, although the number of nodes is not limited.

These clients may be any suitable device, such as a smart phone, laptop computer, desktop computer, tablet or any other computing device having a network interface.

The nodes, or clients, on the second network 51 may communicate using addresses that are unique to the second network 51, such as IP addresses. Similarly, the devices on the first network 31 may communicate using addresses that are unique to that first network 31. The gateway controller 150 has the capability to translate an address from the first network 31 to an address on the second network 51, and vice versa.

Figure 3:
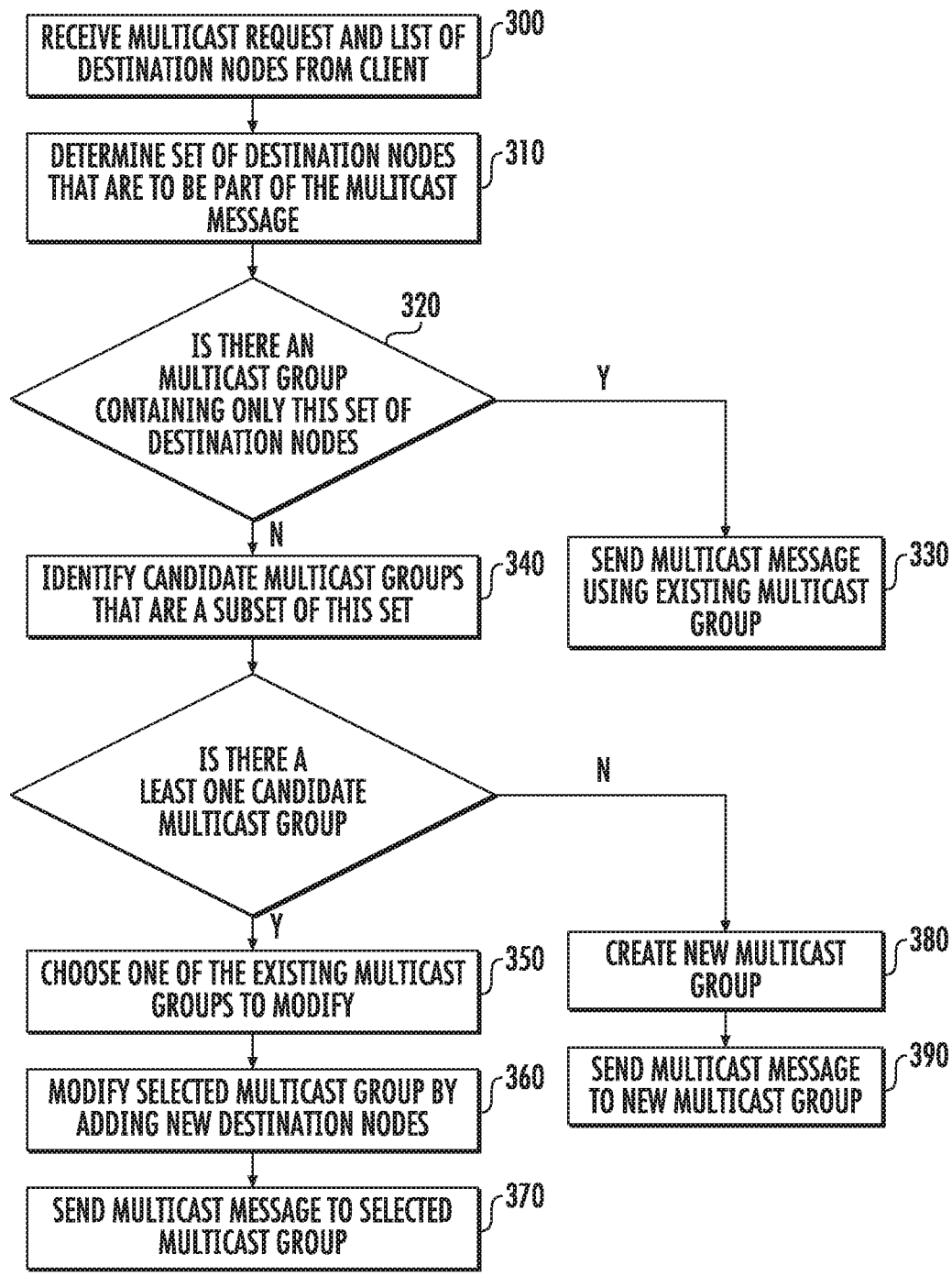
FIG. 3 is a representative flowchart showing the operation of the gateway controller.

In certain embodiments, a client on the second network 51, such as client 101 or client 102, may wish to send a message to a plurality of network devices on the first network 31, referred to as destination nodes. The client may transmit this request to the gateway controller 150. The gateway controller 150 may execute a set of instructions in order to transmit this message to the desired destination nodes. A flowchart of these instructions is shown in FIG. 3.

As shown in Process 300, the gateway controller 150 may receive the multicast request from a client 201. That request may also include a list of destination nodes that the multicast message is intended for. In certain embodiments, the second network 51 is an IP network, such as WiFi or Ethernet. In this embodiment, the client 201 may indicate the desired destination nodes through the use of IP addresses. In other words, each network device on the first network 31 has a corresponding IP address that is used by nodes on the second network 51 to address that network device. The gateway controller 150 can then translate the addresses provided by the client 201 to the addresses used on the first network 31. The gateway controller 150 may then parse the list of destination nodes and determine a set of destination nodes that it is to transmit a multicast message to. In certain embodiments, the protocol of the first network may support different security classes. In this embodiment, the gateway controller 150 may maintain a table in its memory. This table may include a list of all known network devices, their network addresses, and their respective security class. Using this table, the gateway controller 150 determines which security class each destination node belongs to before determining the set of destination nodes that are to be part of the multicast group. Using the list provided by the client and its knowledge of the security classes of each destination node, the gateway controller 150 determines a set of destination nodes that are to be part of the multicast message, as shown in Process 310.

The gateway controller 150 may also maintain a table 400 that contains the multicast group identifier, a list of nodes in that multicast group and the cryptographic state information for that multicast group. A representative drawing of this table 400 is shown in FIG. 4. This table 400 represents all of the existing multicast groups. In certain embodiments, the nodes that are part of a multicast group may be expressed as bits in a bitmask.

Next, as shown in Process 320, the gateway controller 150 determines whether there is an existing multicast group that includes exactly the set of destination nodes determined in Process 310. If so, the gateway controller 150 transmits a multicast message to the set of destination nodes using the existing multicast group, as shown in Process 330.

If none of the existing multicast groups include exactly the set of destination nodes determined in Process 310, the gateway controller 150 then attempts to identify multicast groups that are a subset of that set, as shown in Process 340. In this disclosure, a subset is defined as a group of nodes that includes less than all of the destination nodes in the set, but does not include any nodes that are not part of the set. These identified multicast groups may be referred to as candidate multicast groups. As an example, if the set includes destination nodes 102*a*, 102*b* and 102*c*, then multicast group 2 (see FIG. 4) is a subset, but multicast groups 1 and N are NOT subsets, as each includes at least one node that is not part of the set.

If the gateway controller 150 has identified at least one candidate multicast group, the gateway controller then chooses one of these candidate multicast groups to modify, as shown in Process 350. This candidate multicast group that is chosen is referred to as the selected multicast group. The gateway controller 150 may use various criteria in making this selection. In one embodiment, the gateway controller 150 may choose the candidate multicast group that is closest to the new set. In other words, the candidate multicast group that shared the most nodes with the new set is selected. Thus, if a first candidate multicast group has 3 of the four nodes that are in the new set, while a second candidate multicast group has only 2 of the four nodes, the gateway controller 150 may select the first candidate multicast group.

In another embodiment, the gateway controller 150 may select the candidate multicast group based on use. For example, if a candidate multicast group is used very rarely, the gateway controller 150 may select this candidate multicast group, as there is little chance that this candidate multicast group will be otherwise needed. In a variation of this embodiment, the gateway controller 150 may select the candidate multicast group that was least recently used. Again, there may be little chance that this candidate multicast group will be otherwise needed.

In yet another embodiment, the gateway controller 150 may use both of these criteria. In other words, the gateway controller 150 may identify a smaller group of candidate multicast groups that contain a larger number of shared nodes, and select from this smaller group the candidate multicast group that is least used. Alternatively, the gateway controller 150 may identify a smaller group of candidate multicast groups that are infrequently used, and select from this smaller group the candidate multicast group that requires the least modification.

Once the gateway controller 150 determines which is the selected multicast group, it modifies that selected multicast group, as shown in Process 360. This may involve amending the table 400 to include more destination nodes in that selected multicast group.

Once the selected multicast group has been updated, the gateway controller 150 transmits a multicast message to this selected multicast group, as shown in Process 370.

Returning to Process 340, if the gateway fails to identify at least one candidate multicast group, a new multicast group must be created, as shown in Process 380. In certain embodiments, the gateway controller 150 may only support a limited number of multicast groups. If the number of existing multicast groups is less than this number, the gateway controller 150 simply creates a new multicast group. This is done by adding a new entry to the table 400.

However, if the number of existing multicast groups is already at its maximum, the gateway controller 150 must discard one of the entries in the table 400 and use that entry for the new multicast group. In one embodiment, the gateway controller 150 may discard a multicast group that is infrequently used, as there is little chance that this multicast group will be needed. In a variation of this embodiment, the gateway controller 150 may select the multicast group that was least recently used. Again, there may be little chance that this multicast group will be otherwise needed. The gateway controller 150 then creates the new multicast group using this entry. It also invalidates the cryptographic state information. Once this is done, the gateway controller 150 sends a multicast message to this new multicast group, as shown in Process 390.

In Process 360, the gateway controller has added one or more destination nodes to this multicast group by modifying its table 400. The following is an example of a mechanism by which this process can be performed.

In one example, the new multicast group, as determined by the gateway controller in Process 310, comprises destination nodes 102*a*-102*c*. In Process 340, the gateway controller 150 identifies multicast group 2 (see FIG. 4) as a candidate multicast group. Since there are no other candidate multicast groups, multicast group 2 becomes the selected multicast group, as shown in Process 350. Then, in Process 360, the gateway controller 150 modifies this entry in the table 400 to include 102*c*. The gateway controller 150 then send a multicast message to multicast group 2.

Figure 5:
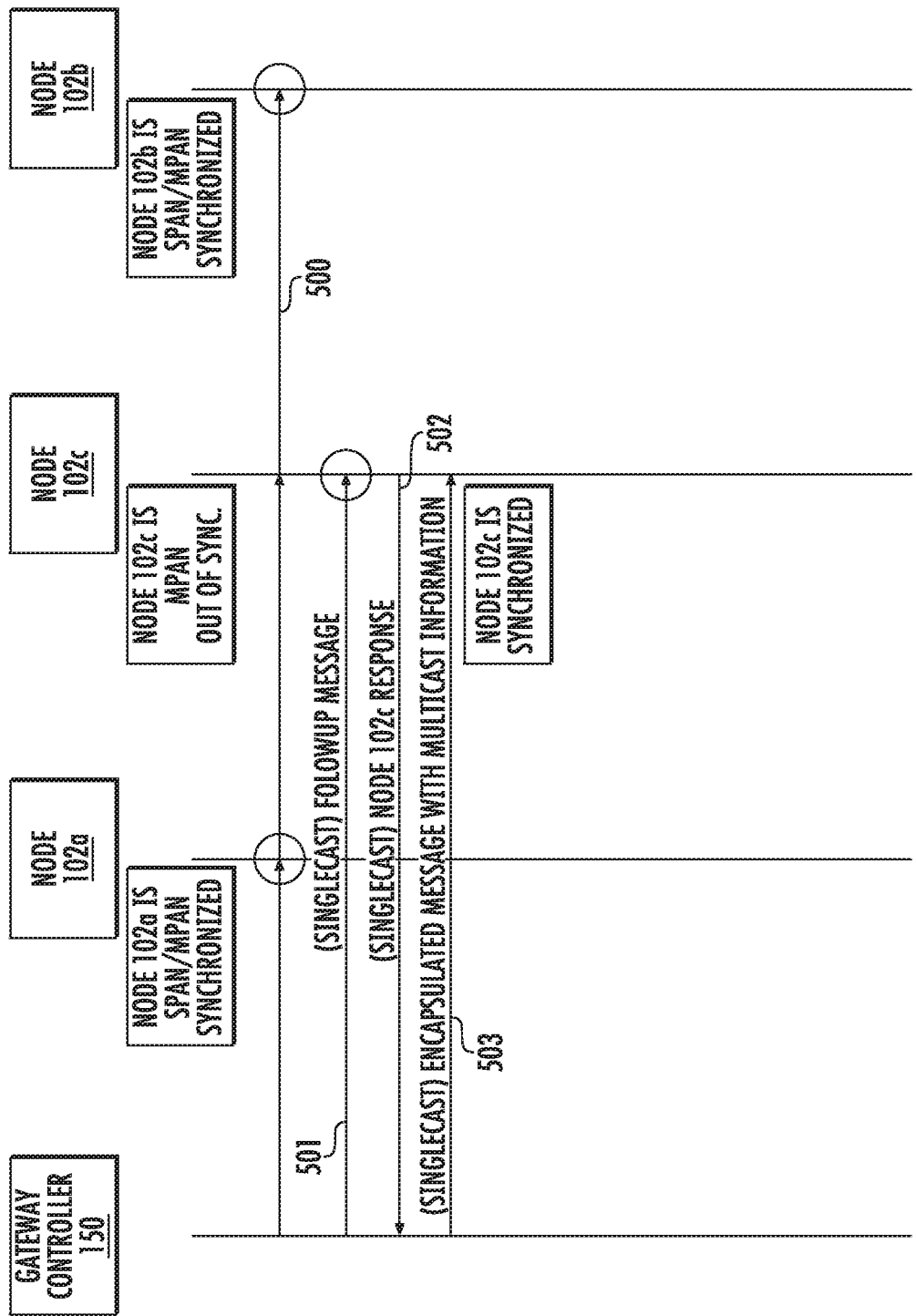
FIG. 5 shows the operation of the gateway controller transmitting a multicast message.

FIG. 5 shows the process by which a new destination node joins the selected multicast group. In this example, it is assumed that that destination nodes 102*a* and 102*b* are already part of the multicast group and that the gateway controller 150 has added destination node 102*c* to this group.

First, the gateway controller 150 transmits the multicast message to the modified multicast group, as shown in Process 370. This is represented as the first communication 500 in FIG. 5. The circles on first communication 500 indicate when the associated node is synchronized with the multicast group and has received the message. Note that destination nodes 102*a* and 102*b* were already part of the multicast group, and therefore receive the initial multicast message. Therefore, if the multicast message was instructing the destination nodes in the multicast group to turn on or turn off a light, the response of destination nodes 102*a* and 102*b* would be nearly instantaneous and would be simultaneous. However, destination node 102*c* was not previously part of the multicast group, so it does not acknowledge first communication 500. Subsequently, the gateway controller 150 may send a singlecast followup message 501 to destination node 102*c* to obtain its status. In this example, it is assumed that destination node 102*c* is able to communicate with the gateway controller 150 using singlecast messages. In other words, it is assumed that destination node 102*c* has the proper SPAN (Singlecast Pre-Agreed Nonce). Destination node 102*c* will return a singlecast response 502, which indicates that it is out of sync with the Multicast Group being used. In other words, it does not have the proper MPAN (Multicast Pre-Agreed Nonce). In certain embodiments, the singlecast followup message 501 contains the command that was issued in the first communication 500. In this way, the destination node 102c can execute the command that was sent to the multicast group in the first communication 500. Thus, a small delay exists between when the destination nodes 102a, 102b respond and when destination node 102c responds to the command. Finally, upon receipt of this singlecast response 502, the gateway controller 150 may send an encapsulated message 503 with the multicast information, including the MPAN. At this point, destination node 102c is now synchronized with this new multicast group. Going forward, the destination node 102c is part of the multicast group and will respond to all multicast communications sent to this multicast group. While a slight delay is introduced with respect to destination node 102c, the other destination nodes that were already part of the multicast group can respond simultaneously. Further, this delay only happens when the destination node 102c is first added to the multicast group.

Note that the process to add a new node to an existing multicast group only requires a small number of singlecast messages between the gateway controller 150 and the new node.

Returning to FIG. 3, in certain embodiments, a new multicast group must be created, as shown in Process 380. This can be done in two ways. First, a completely new multicast group ID may be used. In this embodiment, the gateway controller 150 adds a new entry to the table 400. It then sends a multicast message to the first network 31. Since this is a new multicast group, none of the destination nodes in this group will respond to this multicast message. The gateway controller 150 will then send follow up messages to each node, as described above. In this way, each destination node that is part of the new multicast group will be synchronized.

In addition to creating a completely new multicast group, a previously used multicast group number may be reused. In this case, the gateway controller 150 takes an existing entry in the table 400 and changes the nodes that are part of that multicast group. The gateway controller 150 then resets or otherwise modifies the cryptographic state such that none of the members of the original multicast group are able to decrypt the multicast message. In response, the gateway controller 150 will issues follow up messages only to the destination nodes that are part of the modified multicast group. In this way, the new multicast group is synchronized.

The present disclosure has many advantages. First, the present disclosure provides a method and system for efficiently creating new multicast groups. As described above, the gateway controller 150 first attempts to locate an existing multicast group that includes exactly the desired destination nodes. If such a group does not exist, the gateway controller 150 attempts to modify an existing multicast group. Importantly, when modifying an existing multicast group, the gateway controller 150 will only add nodes to an existing group; it will not delete nodes from an existing group. This allows the already synchronized nodes in the multicast group to continue reacting simultaneously to the multicast message. Only the newly added nodes will show a delayed reaction.

Furthermore, adding a node to an existing multicast group only requires the gateway controller 150 to send singlecast messages to the new node. In contrast, deleting a node from an existing multicast group requires the gateway controller 150 to send singlecast messages to all of the members of the existing multicast group, except the node being removed. Thus, it is much more efficient to add nodes to an existing multicast group than to remove nodes from an existing multicast group.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of using a gateway controller to communicate with a plurality of destination nodes, wherein the plurality of destination nodes communicate with the gateway controller via a first network interface of the gateway controller and utilize a network protocol that supports multicast, comprising:

receiving, at a second network interface of the gateway controller, a request from a client that is destined for the plurality of destination nodes, the plurality of destination nodes defining a set;

determining within the gateway controller whether an existing multicast group contains only the set, and, if so, sending a multicast message using the existing multicast group via the first network interface;

otherwise, identifying candidate multicast groups that are a subset of the set;

choosing one of the candidate multicast groups, referred to as a selected multicast group, to be modified;

modifying the selected multicast group, wherein the modification consists of adding nodes to the selected multicast group to form the set; and sending a multicast message to the selected multicast group via the first network interface.

2. The method of claim 1, wherein the network protocol comprises Z-Wave protocol.

3. The method of claim 1, wherein the selected multicast group is chosen based on a number of nodes in common with the set.

4. The method of claim 1, wherein the selected multicast group is chosen based on use.

5. The method of claim 4, wherein the selected multicast group is a candidate multicast group that is least recently used.

6. The method of claim 4, wherein the selected multicast group is a candidate multicast group that is least used.

7. The method of claim 1, further comprising:

if no candidate multicast groups are identified, creating a new multicast group; and sending a multicast message to the new multicast group via the first network interface.

8. The method of claim 7, wherein the new multicast group is created by:

adding a new entry to a table, the table containing a list of multicast groups, and the nodes in each multicast group.

9. The method of claim 7, wherein the new multicast group is created by:
- deleting an entry in a table, the table containing a list of multicast groups, and the nodes in each multicast group; and
- rewriting the entry with a new list of nodes and new cryptographic information.

10. A gateway controller, comprising:
- a first network interface utilizing a network protocol that supports multicast, wherein the first network interface is in communication with a plurality of destination nodes;
- a second network interface;
- a processing unit; and
- a memory device in communication with the processing unit, comprising instructions, which, when executed by the processing unit, enable the gateway controller to:
- receive, at the second network interface of the gateway controller, a request from a client that is destined for the plurality of destination nodes, the plurality of destination nodes defining a set;
- determine within the gateway controller whether an existing multicast group contains only the set, and, if so, send a multicast message using the existing multicast group via the first network interface;
- otherwise, identify candidate multicast groups that are a subset of the set;
- choose one of the candidate multicast groups, referred to as a selected multicast group, to be modified;
- modify the selected multicast group, wherein the modification consists of adding nodes to the selected multicast group to form the set; and
- send a multicast message to the selected multicast group via the first network interface.

11. The gateway controller of claim 10, wherein the network protocol comprises Z-Wave protocol.

12. The gateway controller of claim 10, wherein the gateway controller chooses the selected multicast group based on a number of nodes in common with the set.

13. The gateway controller of claim 10, wherein the gateway controller chooses the selected multicast group based on use.

14. The gateway controller of claim 13, wherein the selected multicast group is a candidate multicast group that is least recently used.

15. The gateway controller of claim 13, wherein the selected multicast group is a candidate multicast group that is least used.

16. The gateway controller of claim 10, further comprising instructions, which, when executed by the processing unit, enable the gateway controller to:
- if no candidate multicast groups are identified, create a new multicast group; and
- send a multicast message to the new multicast group via the first network interface.

17. The gateway controller of claim 16, further comprising instructions which, when executed by the processing unit, enable the gateway controller to create a new multicast group by:
- adding a new entry to a table, the table containing a list of multicast groups, and the nodes in each multicast group.

18. The gateway controller of claim 16, further comprising instructions which, when executed by the processing unit, enable the gateway controller to create a new multicast group by:
- deleting an entry in a table, the table containing a list of multicast groups and the nodes in each multicast group; and
- rewriting the entry with a new list of nodes and new cryptographic information.

19. A method of using a gateway controller to communicate with a plurality of destination nodes, wherein the plurality of destination nodes communicate with the gateway controller via a first network interface of the gateway controller and utilize a network protocol that supports multicast, comprising:
- receiving at a second network interface of the gateway controller, a request from a client that is destined for the plurality of destination nodes; and
- sending a multicast message to the plurality of destination nodes using a multicast group via the first network interface, wherein the multicast group is created by adding additional nodes to an existing multicast group.

* * * * *